(12) United States Patent
Hariki et al.

(10) Patent No.: US 7,580,773 B2
(45) Date of Patent: Aug. 25, 2009

(54) HANDLING ROBOT SYSTEM

(75) Inventors: Kazuo Hariki, Yamanashi (JP); Masaru Oda, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 691 days.

(21) Appl. No.: 11/227,077

(22) Filed: Sep. 16, 2005

(65) Prior Publication Data

US 2006/0057239 A1    Mar. 16, 2006

(30) Foreign Application Priority Data

Sep. 16, 2004 (JP) ............................. 2004-270171

(51) Int. Cl.
*G06F 19/00* (2006.01)

(52) U.S. Cl. .................. 700/245; 700/256; 700/264; 361/680; 361/683; 361/71; 361/72; 361/73; 714/15; 714/24; 901/3; 701/23

(58) Field of Classification Search ................. 700/245, 700/256, 264; 361/72, 73, 74, 75, 680, 683; 714/15, 24; 901/1, 3; 701/23; 318/568.11
See application file for complete search history.

(56) References Cited

U.S. PATENT DOCUMENTS

| | | | | |
|---|---|---|---|---|
| 5,272,805 | A * | 12/1993 | Akeel et al. .................. | 29/712 |
| 7,395,606 | B2 * | 7/2008 | Crampton .................... | 33/503 |
| 2006/0232052 | A1 * | 10/2006 | Breed ........................ | 280/735 |

(Continued)

FOREIGN PATENT DOCUMENTS

CH        373 246        11/1963

(Continued)

OTHER PUBLICATIONS

Gravel et al., Flexible robotic assembly efforts at Ford Motor Company, 2001, IEEE, p. 173-182.*

(Continued)

*Primary Examiner*—Khoi Tran
*Assistant Examiner*—McDieunel Marc
(74) *Attorney, Agent, or Firm*—Staas & Halsey LLP (57) ABSTRACT

A handling robot system, including a table having a placement surface for placing articles; an article dispersing mechanism for dispersing the articles placed on the placement surface of the table across the placement surface; a vision sensor for detecting each of the articles dispersed on the placement surface of the table; and a robot operating, based on article detection data from the vision sensor, to hold the articles one by one. The article dispersing mechanism includes a partition member for producing a relative motion in relation to the table, the partition member being disposed in proximity to the placement surface with a gap defined therebetween, to divide a space adjoining the placement surface into a first region to which the articles are brought and a second region at which the robot operates to hold the articles transferred from the first region; and a drive control section for causing the relative motion between the table and the partition member in accordance with a program describing a mode of the relative motion. A certain number of articles are dispersed, as a result of the relative motion produced under the control of the drive control section, to permit the articles to pass through the gap on the placement surface, and are transferred from the first region to the second region.

11 Claims, 5 Drawing Sheets

U.S. PATENT DOCUMENTS

| | | | |
|---|---|---|---|
| 2007/0228703 A1* | 10/2007 | Breed | 280/735 |
| 2008/0067792 A1* | 3/2008 | Breed | 280/734 |
| 2008/0082237 A1* | 4/2008 | Breed | 701/45 |
| 2008/0243342 A1* | 10/2008 | Breed | 701/45 |
| 2008/0272580 A1* | 11/2008 | Breed | 280/735 |
| 2008/0284145 A1* | 11/2008 | Breed | 280/736 |

FOREIGN PATENT DOCUMENTS

| | | |
|---|---|---|
| DE | 19629314 | 2/1998 |
| EP | 0 951 968 | 10/1999 |
| JP | 56-161213 | 12/1981 |
| JP | 61-127514 | 6/1986 |
| WO | 92/03364 | 3/1992 |
| WO | 98/03416 | 1/1998 |

OTHER PUBLICATIONS

Feddma et al., Control for slosh-free motion of an open container, 1997, IEEE, p. 29-36.*

Gräser. Technological Solutions to Autonomous Robot Control, 1998, Internet, p. 1-7.*

Majernik et al., Architecture of an automated lorry production plant, 1990, IEEE, p. 21-27.*

Extended European Search Report issued in corresponding European Patent Application No. 05020000.5, on Feb. 19, 2008.

* cited by examiner

| TYPE | DISPERSING STATE | DISPERSING OPERATION PROGRAM | NORMAL ROTATION (ANGLE OR TIME) | REVERSE ROTATION (ANGLE OR TIME) | WAITING TIME | NUMBER OF REPETITIONS |
|---|---|---|---|---|---|---|
| Wa+Wb | NO ARTICLE IS DETECTED | PR1 | 180° | 90° | 0.5 SEC | 1 |
| Wa+Wb | DIFFICULT TO HOLD DUE TO STACKED ARTICLES | PR2 | 1 SEC | 1 SEC | 0.2 SEC | 3 |
| Wb+Wc | NO ARTICLE IS DETECTED | PR3 | 270° | 90° | 0.5 SEC | 1 |
| Wb+Wc | DIFFICULT TO HOLD DUE TO STACKED ARTICLES | PR4 | 0.5 SEC | 0.5 SEC | 0.2 SEC | 5 |
| Wc+Wa | NO ARTICLE IS DETECTED | PR5 | 90° | 10° | 0.5 SEC | 1 |
| Wc+Wa | DIFFICULT TO HOLD DUE TO STACKED ARTICLES | PR6 | 0.5 SEC | 0.5 SEC | 0.2 SEC | 3 |

HANDLING ROBOT SYSTEM

BACKGROUND OF THE INVENTION

1. Field of the Invention

The present invention relates to a handling robot system (also referred to as an article supplying apparatus), in which a desired article is held and picked from among a plurality of articles and is conveyed and supplied to a designated location.

2. Description of the Related Art

In a typical assembly factory, it is a commonly performed process that a robot holds desired articles to be picked, one by one, from among a plurality of articles (or workpieces) and supplies each article to a designated location. In this type of handling process, the efficiency, economy and reliability, etc. of the system depends on a technique for bringing the articles to a working location at which the robot operates to hold the desired article. Conventionally, a mechanical parts-feeder is generally used to bring the articles to the location for the article-holding operation by the robot. Also, a technique in which the actual position (or position and orientation) of the article to be held is detected by a two-dimensional or three-dimensional vision sensor, and the operation of the robot is thereby corrected, so as to hold the article.

In a handling robot system (also referred to as an article supplying apparatus) having the above-described configuration, in a case where a large number of articles are simultaneously brought to the location for the article-holding operation in view of an improvement in efficiency, etc., it is required to rearrange the articles into a suitably dispersed or scattered condition (i.e., a condition where the overlapping between the articles is eliminated) by applying an intermittent vibration to the stack of a large number of articles, for the purpose of facilitating the holding operation for the desired article by the robot. In this connection, the articles may be damaged if the amplitude of the vibration to be applied is excessively large. Also, in a case where the several types of articles having different sizes, shapes, etc. are simultaneously brought to the location for the article-holding operation, it is required to adjust article-holding operations for respective articles so as to correspond to the type of the article to be held.

Therefore, it is desired to provide a novel handling robot system (or an article supplying apparatus) which has a simple configuration and is capable of suitably dispersing or scattering a large number of articles, even when the large number of articles are simultaneously brought to a location for the article-holding operation of a robot, without subjecting the articles to adverse effects due to the vibration, and which permits a robot to easily and accurately hold the desired article on the basis of the recognition/detection result of a vision or visual sensor. It is also desired to provide a novel handling robot system (or an article supplying apparatus) which allows a supplying operation (or a pick-and-place operation) to be smoothly performed on the several types of articles stacked at a location for the article-holding operation. In this case, it is desired for the handling robot system to be capable of suitably dispersing the articles only by a simple motion such as a vibration, of storing and containing a large number of articles, and of easily performing a continuous operation for a long period.

SUMMARY OF THE INVENTION

It is an object of the present invention to provide a handling robot system (or an article supplying apparatus), which is applicable to a configuration wherein a large number or several types of articles are simultaneously brought to a location for the article-holding operation of a robot, and which has a simple configuration and is capable of suitably dispersing or scattering the stacked large number of articles, without subjecting the articles to adverse effects due to the vibration, so as to permit a robot to easily and accurately hold the desired article.

In order to accomplish the above object, the present invention provides a handling robot system, comprising a table having a placement surface for placing a plurality of articles; an article dispersing mechanism for dispersing the articles placed on the placement surface of the table across the placement surface; a vision sensor for detecting each of the articles dispersed on the placement surface of the table; and a robot operating, based on article detection data from the vision sensor, to hold the articles one by one; the article dispersing mechanism comprising: a partition member capable of producing a relative motion in relation to the table, the partition member being disposed in proximity to the placement surface with a gap defined therebetween, to divide a space adjoining the placement surface into a first region to which the articles are brought and a second region at which the robot operates to hold the articles transferred from the first region; and a drive control section for causing the relative motion between the table and the partition member in accordance with a program describing a mode of the relative motion; wherein a certain number of articles are dispersed, as a result of the relative motion produced under a control of the drive control section, to permit the articles to pass through the gap on the placement surface, and are transferred from the first region to the second region.

In the above handling robot system, the article dispersing mechanism may further comprise a driving section for producing the relative motion between the table and the partition member under the control of the drive control section.

Also, the drive control section may be incorporated into a robot controller for controlling an operation of the robot.

In this arrangement, the robot may operate under the control of the drive control section, to produce the relative motion between the table and the partition member.

Also, when several types of articles are simultaneously brought into the first region, the vision sensor may distinguish the type of each of the articles and the robot handles each article in accordance with the type as distinguished.

The above handling robot system may further comprise a storage section for storing a plurality of programs respectively describing several modes of the relative motion. In this arrangement, the drive control section may select, from among the plurality of programs stored in the storage section, a program describing a mode of relative motion producing an optimum article dispersing function, based on the article detection data obtained by the vision sensor, and execute the program as selected.

The article dispersing mechanism may further comprise an enclosing member disposed fixedly relative to the partition member. In this arrangement, the partition member may cooperate with the enclosing member to define the first region having an opening above the placement surface.

The relative motion may comprise a rotation about an axis generally perpendicular to the placement surface.

Alternatively, the relative motion may comprise a linear motion in a direction generally parallel to the placement surface.

The drive control section may alternately and repeatedly execute, in accordance with the program, the relative motion in a first direction and the relative motion in a second direction opposite to the first direction.

The vision sensor may comprise one of a two-dimensional vision sensor and a three-dimensional vision sensor.

BRIEF DESCRIPTION OF THE DRAWINGS

The above and other objects, features and advantages of the present invention will become more apparent from the following description of preferred embodiments in connection with the accompanying drawings, wherein.

DETAILED DESCRIPTION

The embodiments of the present invention are described below in detail, with reference to the accompanying drawings. In the drawings, the same or similar components are denoted by common reference numerals.

Figure 1:
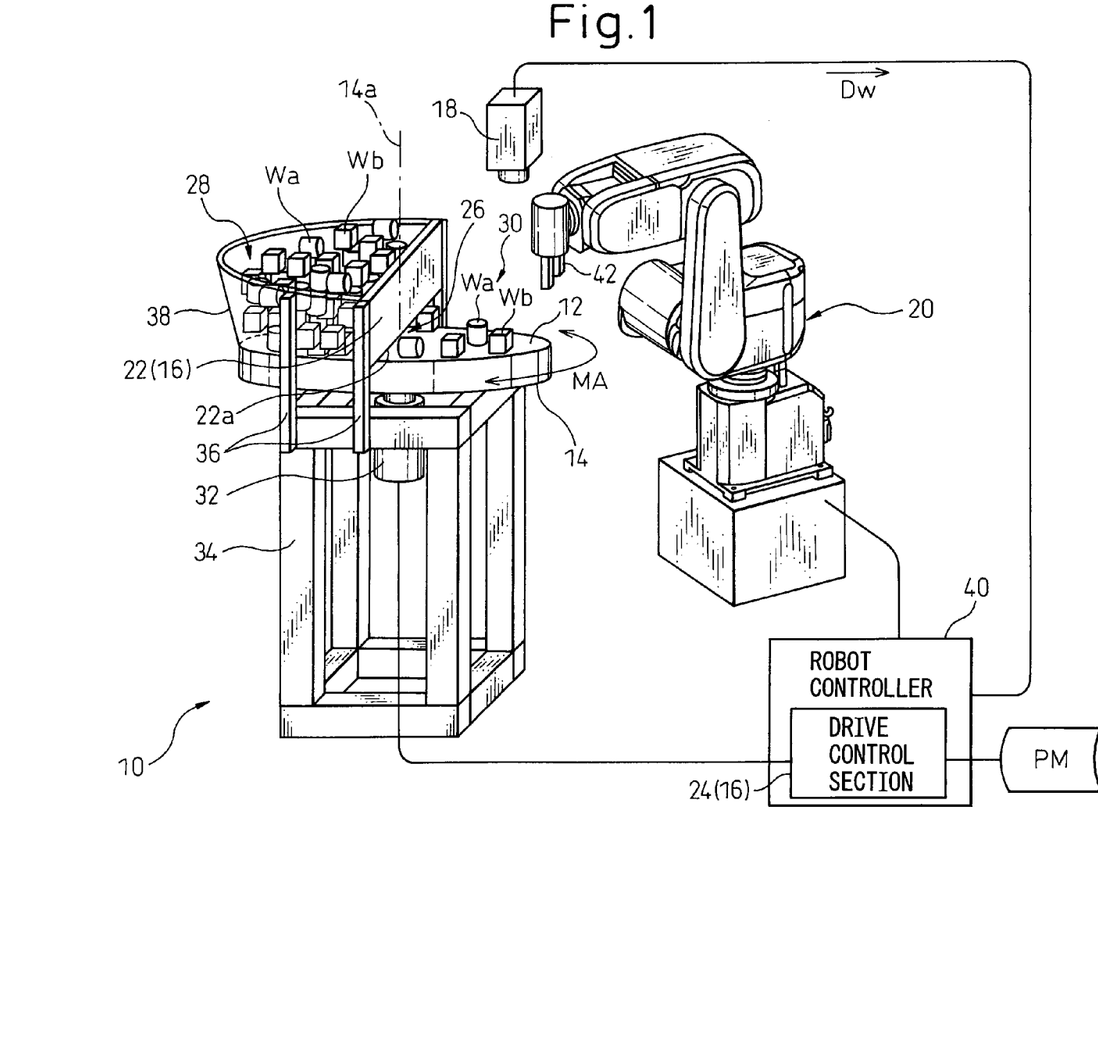
FIG. 1 is a perspective view showing schematically a handling robot system according to a first embodiment of the present invention.

Referring to the drawings, FIG. 1 schematically shows a handling robot system (also referred to as an article supplying apparatus) 10 according to a first embodiment of the present invention. The handling robot system 10 includes a table 14 having a placement surface 12 for placing a plurality of articles (or workpieces) Wa, Wb thereon; an article dispersing mechanism 16 for dispersing or scattering the articles Wa, Wb placed on the placement surface 12 of the table 14 across the placement surface 12; a vision or visual sensor 18 for detecting each of the articles Wa, Wb dispersed on the placement surface 12 of the table 14; and a robot 20 adapted to operate to hold the articles Wa, Wb one by one, on the basis of the article detection data Dw obtained from the vision sensor 18. The robot 20 operates to hold the desired article picked from among the articles Wa, Wb brought to the location on the table 14, and conveys and supplies the article to a designated location (not shown).

The article dispersing mechanism 16 includes a partition member 22 capable of producing a relative motion MA in relation to the table 14, and a drive control section 24 for causing the relative motion MA between the table 14 and the partition member 22 in accordance with a program PM describing the mode or type of the relative motion MA. The partition member 22 is disposed in proximity to the placement surface 12 with a gap 26 defined therebetween, and divides a space adjoining the placement surface 12 into a first region 28 to which the articles Wa, Wb are brought, and a second region 30 at which the robot 20 operates to hold the articles Wa, Wb transferred from the first region 28. The article dispersing mechanism 16 functions to disperse, as a result of the relative motion MA produced under the control of the drive control section 24, a certain number of articles Wa, Wb so as to permit the articles to pass through the gap 26 on the placement surface 12, and thereby transfers the articles from the first region 28 to the second region 30.

In the illustrated embodiment, the article dispersing mechanism 16 includes a driving section 32, for an exclusive use, which produces the relative motion MA between the table 14 and the partition member 22 under the control of the drive control section 24. The article dispersing mechanism 16 further includes a base 34 which supports the table 14 in a manner rotatable about an axis 14a generally perpendicular to the placement surface 12. The driving section 32 is composed of, e.g., an electric motor, and rotates the table 14 on the base 34 in a desired direction about the axis 14a in accordance with the control of the drive control section 24.

The partition member 22 is provided so as to divide the space above the placement surface 12 of the rotary table 14 generally in half, and is mounted fixedly to the base 34 through an attaching member 36. The first region 28 of the space divided by the partition member 22 on the table 14 is situated on a side away from the robot 20 (on the left side in FIG. 1), and a large number of articles Wa, Wb are brought to the first region 28. An enclosing member 38 is provided above the table 14 to extend along the outer periphery of the table 14 on the side of the first region 28, and is disposed fixedly relative to the partition member 22. The enclosing member 38 is fixedly mounted to the base 34 through the attaching member 36, and cooperates with the partition member 22 so as to define the first region 28 having an opening above the placement surface 12. Thereby, the first region 28 constitutes an article containing space for stably containing and storing the large number of articles Wa, Wb. In the illustrated embodiment, the enclosing member 38 is a frame board member bent into a U-shape, and is formed from a transparent or translucent resinous material which allows the contents of the first region 28 to be visually recognized.

The partition member 22 is provided with the lower edge 22a spaced from the placement surface 12 by a predetermined distance so as to form the gap 26 having a predetermined dimension. The dimension of the gap 26 is designed such that the large number of articles Wa, Wb brought to the first region (or an article containing space) 28 pass through the gap 26 little by little as the table 14 rotates, and that the articles having passed through the gap are suitably dispersed on the placement surface 12 in the second region 30 as illustrated.

The articles Wa, Wb brought to the first region 28 are not necessarily of the same type, and the articles Wa, Wb of various types (e.g., shapes) may be brought to the first region 28 provided that the entire dimensions thereof are not significantly different from each other. In the illustrated embodiment, a large number of articles including articles Wa with cylindrical shapes and articles Wb with rectangular parallelepiped shapes are brought indiscriminately to the first region 28. The method of bringing the articles is not particularly limited, and any method may be employed, such as using a conveyor or a handling robot provided in a stage previous to the handling robot system 10, or using a manual operation.

In the illustrated embodiment, the drive control section 24 is incorporated into the robot controller 40 that controls the operation of the robot 20. Therefore, the driving section (or the electric motor) 32 for rotationally driving the table 14 is connected to the robot controller 40. The contents of the control executed by the drive control section 24 are described in one or more programs PM (usually prepared by teaching) provided in the robot controller 40, which permit the switching of forward/reverse rotations, the rotation angle, the rotating speed, etc. of the driving section (or the electric motor) 32 to be controlled (as described later in detail). The table 14 can rotate in accordance with a command from the robot controller 40 in clockwise and anti-clockwise directions as observed from a viewpoint defined above the table (see the bidirectional arrow MA).

As illustrated, when the table 14 rotates in the clockwise or anti-clockwise direction in a state where the large number of cylindrical articles Wa and rectangular-parallelepiped articles Wb are brought to the first region (or the article containing space) 28 of the article dispersing mechanism 16, the articles Wa, Wb contained and stored in a stacked or superimposed state in the first region 28 (in the left side of the partition member 22 in the drawing) pass through the gap 26 defined beneath the partition member 22 little by little (e.g., one by one), and are thereby transferred to the second region 30 in the right side of the partition member 22.

The vision sensor (or a detector head) 18 is composed of a two-dimensional or three-dimensional vision sensor, and typically employs a CCD camera alone or in combination with a patterned light projector. The vision sensor 18 is connected to the robot controller 40, and the robot controller 40 performs the operational control of the vision sensor 18 as well as the processing, analysis and storage of image data obtained by the vision sensor. Procedure of using the vision sensor 18 and the robot controller 40 to detect the shape, position, orientation, etc. of articles is well-known and, thus, an explanation thereof is omitted.

The robot 20 has a configuration in which a hand 42 is attached to the distal end of an articulated arm and the opening/closing operation of the hand 42 is controlled by the robot controller 40. When the vision sensor 18 recognizes and detects one or more articles Wa or Wb in the second region 30, data relating to the position (or the position and orientation) of one article to be held by the next robot operation are acquired. The robot controller 40 executes a robot operation (or a picking operation) as corrected based on these article detection data, whereby the robot 20 holds one article (Wa or Wb) in the second region 30 and conveys it to a designated location. In this connection, a countermeasure for a situation wherein the article detection result obtained by the vision sensor 18 is inappropriate for the picking operation of the robot 20 (e.g., "no article is detected") will be described later.

In the above configuration in which the several types of articles Wa, Wb are simultaneously brought to the first region 28, the vision sensor 18 can also distinguish the type (e.g., the shape) of each of the articles Wa, Wb. In this configuration, the robot 20 may carry out a type-corresponding handling operation on each article, based on the data relating to the distinguished type of the article.

Figure 2:
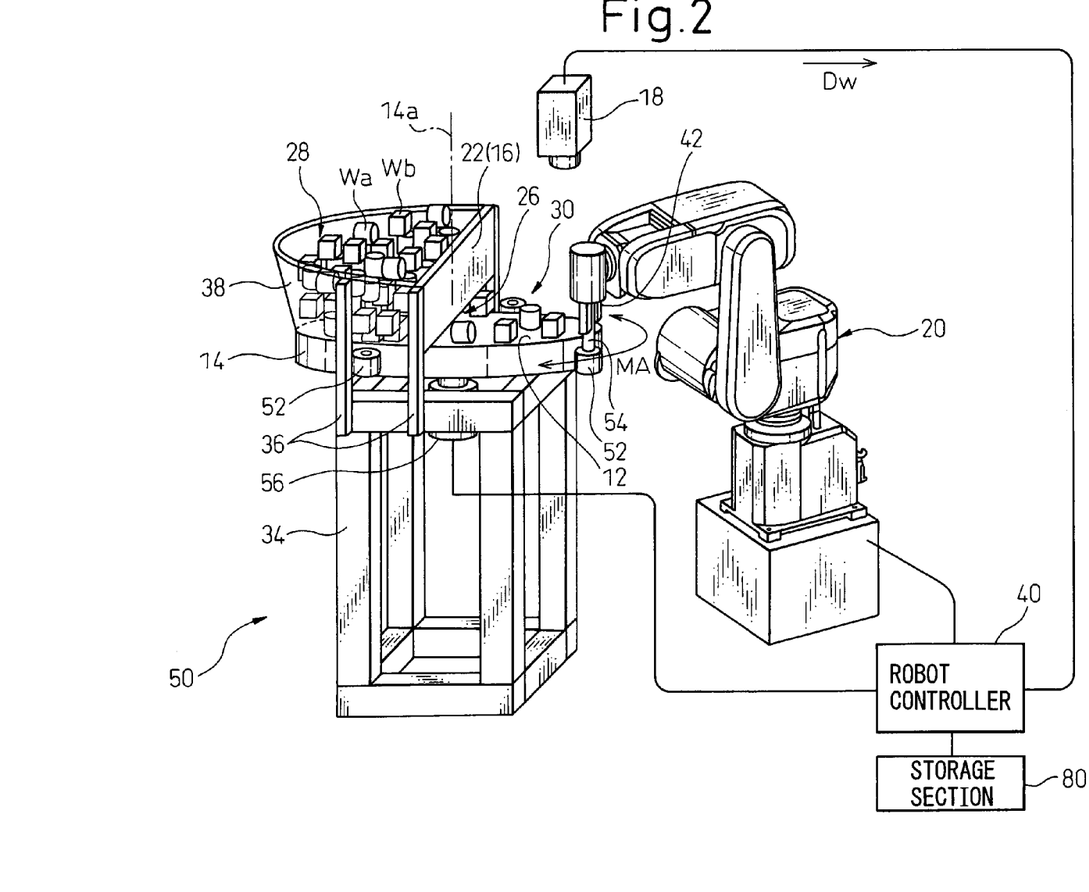
FIG. 2 is a perspective view showing schematically a handling robot system according to a second embodiment of the present invention.

FIG. 2 schematically shows a handling robot system (also referred to as an article supplying apparatus) 50 according to a second embodiment of the present invention. The handling robot system 50 has substantially the same configuration as the handling robot system 10 of the first embodiment, except that, in place of the provision of the driving section 32 exclusively for the article dispersing mechanism, the robot 20 is constructed to function also as the driving section. Therefore, corresponding components are denoted by common reference numerals or symbols, and an explanation thereof is not repeated.

In the handling robot system 50, the robot 20 operates under the control of the robot controller (or the drive control section) 40, so as to produce a relative rotational motion MA between the table 14 and the partition member 22. To this end, one or more robot joints 52 for a rotation drive are provided at one or more suitable positions along the peripheral edge of the table 14. The robot 20 can hold, by the hand 42 at the end of the arm, not only the articles Wa, Wb but also an engaging member 54 engageable with each robot joint 52. Thus, the robot 20 operates to rotationally drive the table 14 by the motion of the arm with the engaging member 54 held by the hand 42 being engaged with the robot joint 52.

The combination of the robot joint 52 and the engaging member 54 may be constructed in various ways. In the illustrated embodiment, the configuration in which a rod-shaped engaging member 54 is inserted into a bore formed in the robot joint 52 is employed. More than one engaging member 54 may be provided, which may be retained in a state to be inserted into the bore of the robot joint 52 situated on the right side (on the side near the robot) of the partition member 22, during not only a period when the robot 20 operates to rotationally drive the table 14, but also a period when the robot does not operate to drive the table.

A rotation lock member (or a brake) 56 may be additionally provided to the table 14, in order to prevent the table 14 from being rotated inadvertently. The rotation lock member 56 operates, under the control of the robot controller 40, to permit the table 14 to be locked or released. Preferably, the rotation lock member 56 is maintained in a locking state, other than a period between an instant just before the start of the rotation drive of the table 14 and an instant just after the finish of the rotation drive.

For the operation of the robot 20 to rotationally drive the table 14, the vision sensor 18 detects the position of the engaging member 54 retained in the robot joint 52, and, based on the detected position data, the robot 20 operates in accordance with the command of the robot controller 40, so as to hold the engaging member 54 with the hand 42. After the rotation lock member 56 turns into the releasing state in accordance with the command of the robot controller 40, the robot 20 operates to rotationally drive the table 14. When the required rotational movement has been completed, the rotation lock member 56 turns to the locking state, and the robot 20 releases the engaging member 54 from the hand 42. In this connection, if the rotation angle of the table 14 is large, the rotation drive may be subsequently performed by changing the robot joint 52 into which the engaging member 54 is to be inserted.

The contents of the control for the robot operation for the table rotation drive, executed by the robot controller 40, are described in one or more programs (usually prepared by teaching) provided in the robot controller 40. According to this configuration, in which the robot 20 acts as the rotary driving section, it is possible to control the switching of the forward/reverse rotations, the rotation angle, the rotating speed, etc. of the table 14.

According to the above configuration, when the robot 20 operates to rotationally drive the table 14, the articles Wa, Wb contained and stored in a stacked or superimposed state in the first region 28 pass through the gap 26 defined beneath the partition member 22 little by little (e.g., one by one), and are thereby transferred to the second region 30 in the right side of the partition member 22, in a way similar to the handling robot system 10 of the first embodiment. After the hand 42 releases the engaging member 54, and when the vision sensor 18 recognizes and detects one or more articles Wa or Wb in the second region 30, the robot controller 40 executes a robot operation (or a picking operation), corrected based on the article detection data from the vision sensor 18, whereby the robot 20 holds one article (Wa or Wb) in the second region 30 and conveys it to a designated location.

Figure 3:
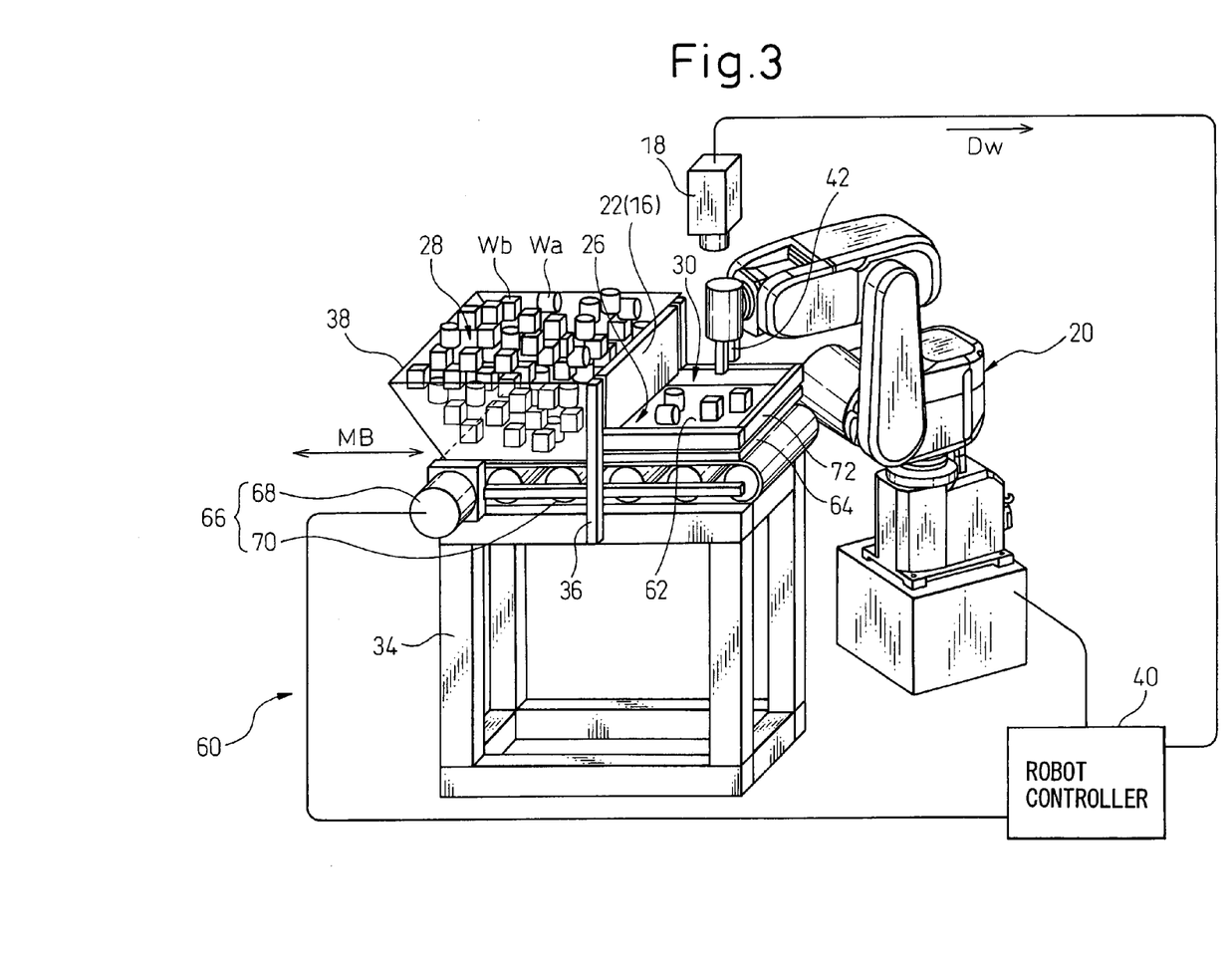
FIG. 3 is a perspective view showing schematically a handling robot system according to a third embodiment of the present invention.

FIG. 3 schematically shows a handling robot system (also referred to as an article supplying apparatus) 60 according to a third embodiment of the present invention. The handling robot system 60 has substantially the same configuration as the handling robot system 10 of the first embodiment, except that, in place of the provision of the rotary table 14, the system adopts a table 64 capable of producing a relative linear motion MB in a direction generally parallel to a placement surface 62 in relation to the partition member 22. Therefore, corresponding components are denoted by common reference numerals or symbols, and an explanation thereof is not repeated.

The handling robot system 60 includes a table 64 having a placement surface 62 for placing a plurality of articles (or workpieces) Wa, Wb thereon; an article dispersing mechanism 16 for dispersing or scattering the articles Wa, Wb placed on the placement surface 62 of the table 64 across the placement surface 62; a vision sensor 18 for detecting each of the articles Wa, Wb dispersed on the placement surface 62 of the table 64; and a robot 20 adapted to operate to hold the articles Wa, Wb one by one, based on the article detection data Dw obtained from the vision sensor 18.

The article dispersing mechanism 16 includes a partition member 22 capable of producing a relative motion MB in relation to the table 64, and a robot controller (or a drive control section) 40 for causing the relative motion MB between the table 64 and the partition member 22 in accordance with a program describing the mode or type of the relative motion MB. The partition member 22 is disposed in proximity to the placement surface 62 with a gap 26 defined therebetween, and divides a space adjoining the placement surface 62 into a first region 28 to which the articles Wa, Wb are brought, and a second region 30 at which the robot 20 operates to hold the articles Wa, Wb transferred from the first region 28. The article dispersing mechanism 16 functions to disperse, as a result of the relative motion MB produced under the control of the robot controller (or the drive control section) 40, a certain number of articles Wa, Wb so as to permit the articles to pass through the gap 26 on the placement surface 62, and thereby transfers the articles from the first region 28 to the second region 30.

In the illustrated embodiment, the article dispersing mechanism 16 includes a driving section 66, for exclusive use, which produces the relative motion MB between the table 64 and the partition member 22 under the control of the robot controller (or the drive control section) 40. The article dispersing mechanism 16 further includes a base 34 which supports the table 64 in a manner linearly displaceable in a direction generally parallel to the placement surface 62. The driving section 66 is composed of, e.g., an electric motor 68 and a belt conveyor 70, and moves the table 64 on the base 34 linearly in a desired direction in accordance with the control of the robot controller (or the drive control section) 40.

An enclosing member 38 is disposed fixedly relative to the partition member 22 above the table 64 to extend along the outer periphery of the table 64 on the side of the first region 28, and also a second low-profile enclosing member 72 is disposed fixedly relative to the partition member 22 above the table 64 to extend along the outer periphery of the table 64 on the side of the second region 30. The enclosing members 38, 72 are mounted fixedly to the base 34 through, e.g., an attaching member 36, and cooperate with the partition member 22 so as to respectively define the first region 28 and the second region 30, each having an opening above the placement surface 62. Thereby, in the second region 30, the dispersed articles Wa, Wb are prevented from falling off the placement surface 62.

The electric motor 68 of the driving section 66 for linearly driving the table 64 is connected to the robot controller 40. The contents of the control for the driving section 66 is described in one or more programs (usually prepared by teaching) provided in the robot controller 40, which permit the switching of forward/reverse rotations, the rotation angle, the rotating speed, etc. of the electric motor 68 (as described later in detail). The table 64 can be moved in accordance with a command from the robot controller 40 in a forward motion toward the robot 20 as well as in a rearward motion away from the robot 20 (see a bidirectional arrow MB).

As illustrated, when the table 64 moves in the forward motion in a state where the large number of cylindrical articles Wa and rectangular-parallelepiped articles Wb are brought to the first region (or the article containing space) 28 of the article dispersing mechanism 16, the articles Wa, Wb contained and stored in a stacked or superimposed state in the first region 28 (in the left side of the partition member 22 in the drawing) pass through the gap 26 defined beneath the partition member 22 little by little (e.g., one by one), and are thereby transferred to the second region 30 on the right side of the partition member 22. When the vision sensor 18 recognizes and detects one or more articles Wa or Wb in the second region 30, the robot controller 40 executes a robot operation (or a picking operation), corrected based on the article detection data from the vision sensor 18, whereby the robot 20 holds one article (Wa or Wb) in the second region 30 and conveys it to a designated location.

Each of the above described embodiments adopts a configuration in which the table 14, 64 moves rotationally or linearly relative to the fixed partition member 22. On the contrary, it is also possible to adopt a configuration in which the partition member moves rotationally or linearly relative to the fixed table. Further, in place of the above configuration in which the drive control section 24 is incorporated into the robot controller 40, it is also possible to constitute the drive control section 24 as a control unit independent of the robot controller 40.

Figure 4:
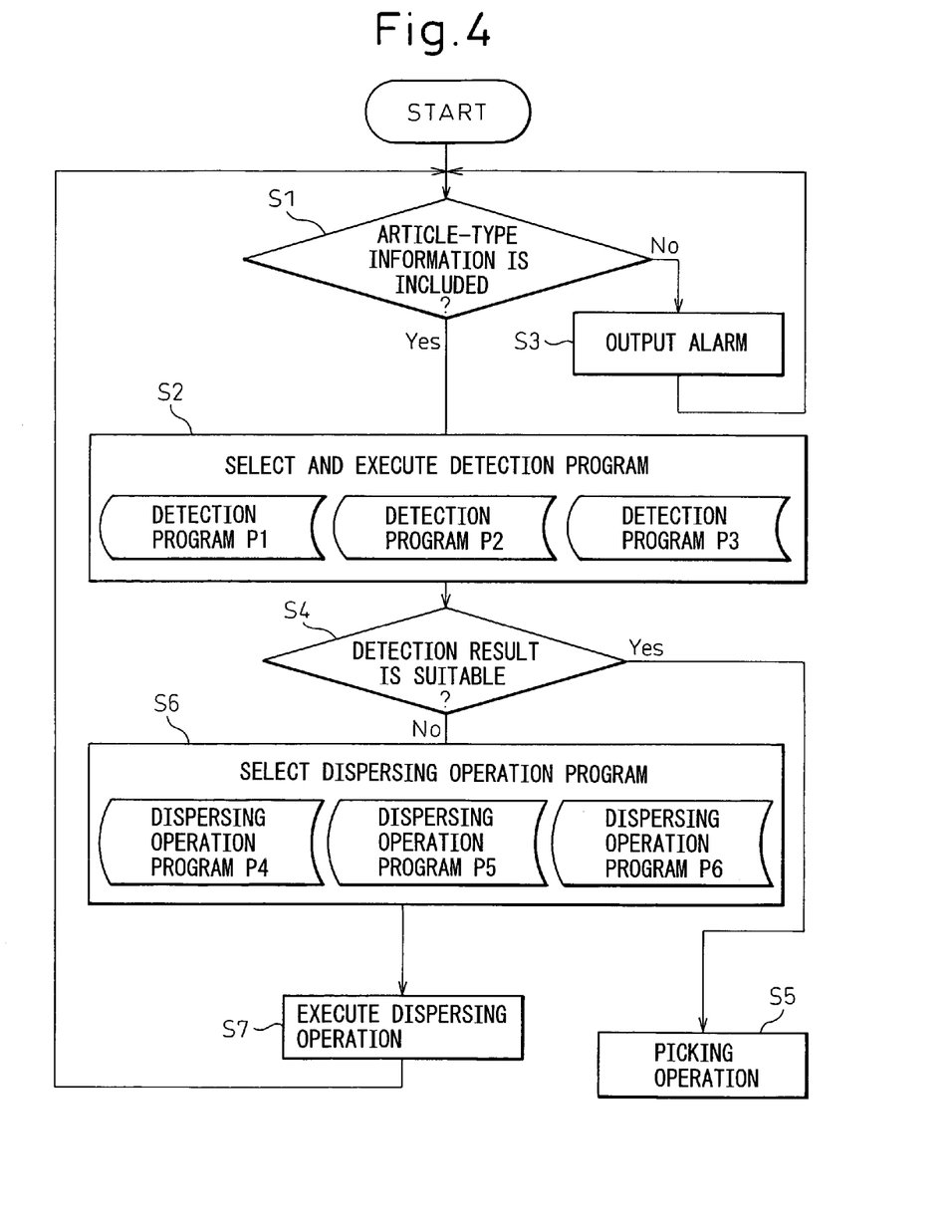
FIG. 4 is a flow chart showing an example of a control steps executed in the handling robot system according to the present invention.

Next, FIG. 4 shows an example of a control flow for an article picking operation performed in the handling robot system according to the present invention. The illustrated example is the control flow for executing a single picking operation by the robot 20 in the handling robot system 10, 50, 60 of the above-described embodiments. The control flow is started upon reception of an external signal indicating that one batch of a large number of articles has been brought to the first region (or the article containing space) 28 of the article dispersing mechanism 16. The external signal may include an article-type information in a format of code data previously registered in the robot controller 40, which indicates what type (whether a single type or the combination of several types) of articles have been sent from another system preceding to the handling robot system 10, 50, 60.

First, the robot controller (or the drive control section) 40 determines whether the article-type information is included in the external signal (step S1), and if the article-type information is included, a detection program for detecting an article by the vision sensor 18 is selected and executed (step S2). The detection program describes the operations and processing steps for recognizing the article and detecting the type (e.g., the shape) and the position (or the position and orientation) of the article by the vision sensor 18. In the illustrated example, three different programs P1 to P3 are provided to correspond to the types of articles to be handled. For example, taking into consideration the cylindrical articles Wa and the rectangular-parallelepiped articles Wb, both described in the above embodiments, and also articles Wc each having a conical shape (not shown), the detection program P1 is used for a detecting operation performed when the articles Wa and Wb are simultaneously brought to the system, the detection program P2 is used for a detecting operation performed when the articles Wb and Wc are simultaneously brought to the system, and the detection program P3 is used for a detecting operation performed when the articles Wc and Wa are simultaneously brought to the system.

If it is determined at step S1 that the article-type information is not included in the external signal, an alarm for warning of an abnormal occurrence is output at step S3 and the control process returns to step S1.

When the selected detection program is executed, then it is determined, at step S4, whether the detection result is suitable for a subsequent picking operation. In the above first to third embodiments, for example, the detection result is determined to be suitable, if the articles Wa, Wb suitably dispersed on the table 14, 64 are present within the field of view of the vision sensor 18 and thereby the recognition of respective articles and the normal detection of the type and the position (or the position and orientation) of each article (i.e., the detection of the article in a state where the robot 20 can hold it) are successfully accomplished. In this case, a picking operation by the robot 20 is performed at step S5.

On the other hand, if the recognition of respective articles and the normal detection of the type and the position (or the position and orientation) of each article (i.e., the detection of the article in a state where the robot 20 can hold it) cannot be successfully accomplished, it is determined that the detection result is unsuitable, and the control process proceeds to step S6. At step S6, a dispersing operation program, for controlling the table 14, 64 to produce the relative motion MA, MB possessing a mode or type for causing an optimum article-dispersing effect, is selected, depending on the type of the article based on the article-type information and on the article dispersing state detected by the vision sensor 18. In the illustrated example, three different dispersing operation programs P4 to P6 are previously provided (or taught) for the respective types and dispersing states of the articles to be handled. In this connection, four or more dispersing operation programs may also be provided. Then, at step S7, the dispersing operation program selected at step S6 is executed.

Figure 5:
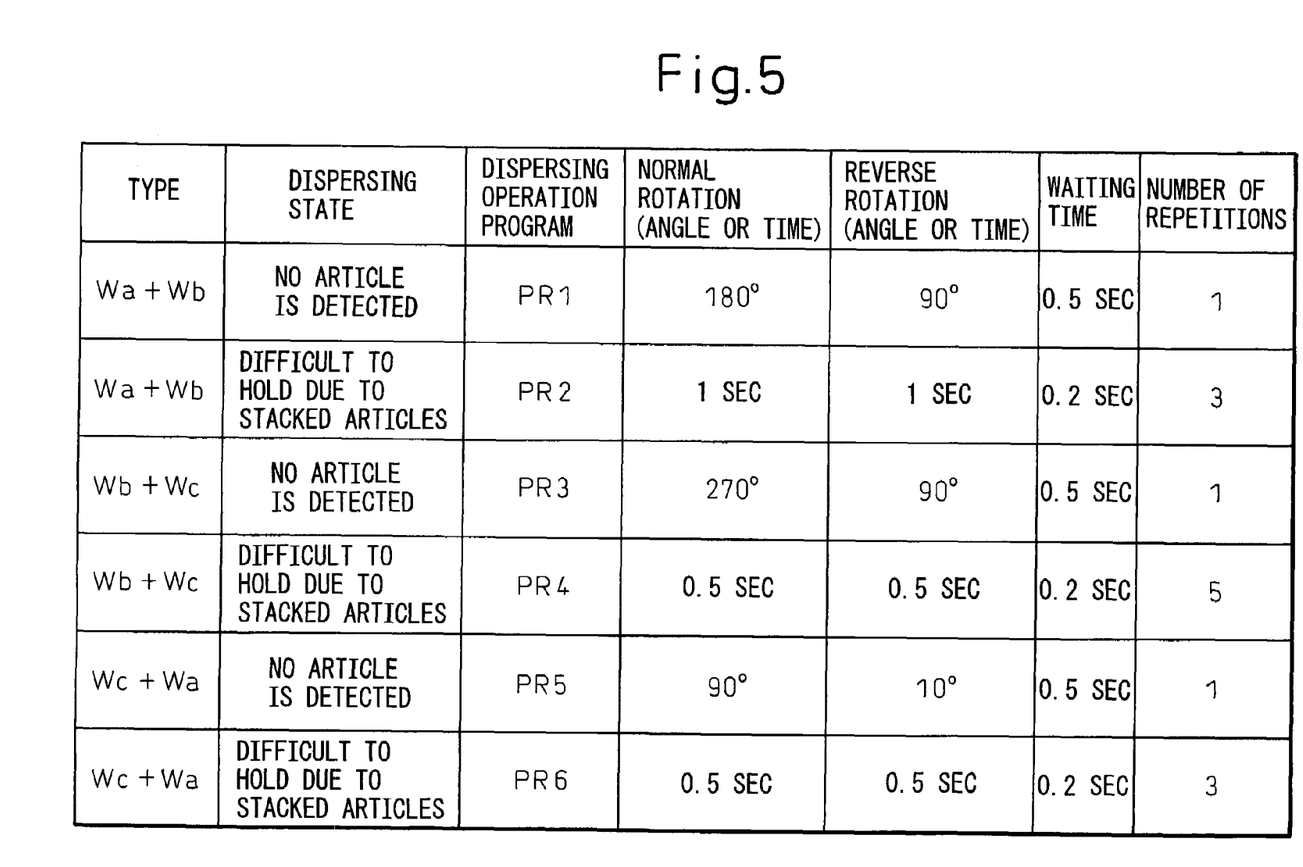
FIG. 5 is an illustration showing examples of article-dispersing operation in the form of a table.

The dispersing operation program describes the relative motion MA, MB of the table 14, 64 for suitably dispersing the articles, depending on the type and dispersing state of the article detected by the vision sensor 18 at step S2, so as to enable the normal detection of the respective articles (i.e., the detection of the article in a state where the robot 20 can hold it) to be achieved. FIG. 5 shows, in the form of a table, exemplary operations described in the dispersing operation programs in association with the types and dispersing states of the articles.

In the example of FIG. 5, the types of the articles, as considered, include the combination of Wa (a cylindrical shape) and Wb (a rectangular-parallelepiped shape), the combination of Wb (a rectangular-parallelepiped shape) and Wc (a conical shape), and the combination of Wc (a conical shape) and Wa (a cylindrical shape). Also, the dispersing states, as considered, include two kinds of states, i.e., the "no article is detected" state and the "difficult to hold due to stacked articles" state. In this case, six dispersing operation programs PR1 to PR6 are provided as illustrated.

In this connection, representative dispersing operation programs will be described. PR1 is a dispersing operation program which should be selected when the vision sensor 18 cannot observe the cylindrical article Wa or the rectangular-parallelepiped article Wb in the second region 30. In the dispersing operation program PR1, a cycle from the step of "rotating the rotary table in a normal direction by 180 degrees", through the step of "rotating the rotary table in a reverse direction by 90 degrees", to the step of "waiting for 0.5 seconds" is carried out at a single time. Thus, the dispersing operation program PR1 intends to surely or reliably transfer the articles Wa and/or Wb from the first region 28 to the second region 30, by causing a relatively large, single-time reciprocal relative motion of the table 14 in the forward and reverse direction under the control of the robot controller (or the drive control section) 40.

On the other hand, PR4 is a dispersing operation program which should be selected when the vision sensor 18 can observe the rectangular-parallelepiped article Wb or the conical article Wc in the second region 30 but it is difficult for the robot 20 to hold each article because of the stacked condition of the articles Wb or Wc. In the dispersing operation program PR4, a cycle from the step of "rotating the rotary table in a normal direction for 0.5 seconds", through the step of "rotating the rotary table in a reverse direction for 0.5 seconds", to the step of "waiting for 0.2 seconds" is repeatedly carried out five times. Thus, the dispersing operation program PR4 is intended to surely or reliably disperse the stacked or superimposed articles Wa and/or Wb, by repeatedly and alternately causing a relatively small, reciprocal relative motion of the table 14 in the forward and reverse direction under the control of the robot controller (or the drive control section) 40.

It should be noted that, although the example of FIG. 5 is applied to the configuration using the rotary table 14 (i.e., the handling robot system 10, 50), it is possible to provide similar various dispersing operation programs for the other configuration using the linearly movable table 64 (i.e., the handling robot system 60), simply by rewriting "normal rotation" to "forward motion" and rewriting "reverse rotation" to "rearward motion" in FIG. 5.

After the dispersing operation program provided for each type and dispersing state of the article has been executed at step S7 in FIG. 4, the process returns to step S1, so as to try again the detection of articles by the vision sensor 18. If, at step S2, the normal detection of the article in accordance with the selected detection program has been successfully accomplished, the article picking operation is performed at step S5. If the normal detection cannot be accomplished even at this stage, the dispersing operation program provided for the article type and dispersing state is again selected and executed (steps S6 and S7). Then, the same process is repeated. Although not explicitly described in the flow chart of FIG. 4, an upper limit may be provided to the number of repetitions in executing the dispersing operation program provided for the article type and dispersing state, and if the process cannot proceed to step S5 (the picking operation) when the number of repetition has reached at the upper limit, an alarm may be output and the system may be halted.

Each handling robot system 10, 50, 60 further includes a storage section 80 (FIG. 2), as a hardware for executing the above-described flow chart, for storing the several programs (e.g., PR1 to PR6) respectively describing the several modes of the relative motion MA, MB. Based on the article detection data from the vision sensor 18, the robot controller (or the drive control section) 40 selects and executes a program describing the mode of relative motion MA, MB capable of producing the optimum article dispersing effect, from among the several programs stored in the storage section 80.

As is apparent from the foregoing description, according to the present invention, even when a large number or several types of articles are simultaneously brought to a location for the article-holding operation of a robot, it is possible by a simple configuration to suitably disperse or scatter the stacked large number of articles, without subjecting the articles to adverse effects due to the vibration, and to permit a robot to easily and accurately hold the desired article on the basis of the recognition/detection result of a vision sensor. Also, a supplying operation (or a pick-and-place operation) is allowed to be smoothly performed on the several types of articles stacked at a location for the article-holding operation.

In particular, the handling robot system according to the present invention is capable of suitably dispersing the articles by only a simple motion such as a vibration, and of storing and containing a large number of articles, so that the inventive system is suitable for a continuous operation for a long period.

While the invention has been described with reference to specific preferred embodiments, it will be understood by those skilled in the art that various changes and modifications may be made thereto without departing from the scope of the following claims.

The invention claimed is:

1. A handling robot system, comprising:
a table having a placement surface for placing a plurality of articles;
an article dispersing mechanism for dispersing the articles placed on said placement surface of said table across said placement surface;
a vision sensor for detecting each of the articles dispersed on said placement surface of said table; and
a robot operating, based on article detection data from said vision sensor, to hold the articles one by one;
said article dispersing mechanism comprising:
a partition member capable of producing a relative motion in relation to said table, said partition member being disposed in proximity to said placement surface with a gap defined therebetween, to divide a space adjoining said placement surface into a first region to which the articles are brought and a second region at which said robot operates to hold the articles transferred from said first region; and
a drive control section for causing said relative motion between said table and said partition member in accordance with a program describing a mode of said relative motion;
wherein said drive control section causes, in accordance with said program, said relative motion in a first direction and said relative motion in a second direction opposite to said first direction, and
wherein a certain number of articles are dispersed, as a result of said relative motion in said first direction and said relative motion in said second direction produced under a control of said drive control section, to permit the articles to pass through said gap on said placement surface, and are transferred from said first region to said second region.

2. A handling robot system as set forth in claim 1, wherein said article dispersing mechanism further comprises a driving section for producing said relative motion in said first direction and said relative motion in said second direction between said table and said partition member under the control of said drive control section.

3. A handling robot system as set forth in claim 1, wherein said drive control section is incorporated into a robot controller for controlling an operation of said robot.

4. A handling robot system as set forth in claim 3, wherein said robot operates under the control of said drive control section, to produce said relative motion in said first direction and said relative motion in said second direction between said table and said partition member.

5. A handling robot system as set forth in claim 1, wherein, when several types of articles are simultaneously brought into said first region, said vision sensor is configured to distinguish a type of each of said articles and said robot is configured to handle each article in accordance with the type as distinguished.

6. A handling robot system as set forth in claim 1, further comprising a storage section for storing a plurality of programs respectively describing several modes of said relative motion; wherein said drive control section selects, from among the plurality of programs stored in said storage section, a program describing a mode of relative motion producing an optimum article dispersing function, based on said article detection data obtained by said vision sensor, and executes said program as selected.

7. A handling robot system as set forth in claim 1, wherein said article dispersing mechanism further comprises an enclosing member disposed fixedly relative to said partition member, said partition member cooperating with said enclosing member to define said first region having an opening above said placement surface.

8. A handling robot system as set forth in claim 1, wherein said relative motion comprises a rotation about an axis generally perpendicular to said placement surface.

9. A handling robot system as set forth in claim 1, wherein said relative motion comprises a linear motion in a direction generally parallel to said placement surface.

10. A handling robot system as set forth in claim 1, wherein said drive control section alternately and repeatedly causes said relative motion in said first direction and said relative motion in said second direction.

11. A handling robot system as set forth in claim 1, wherein said vision sensor comprises one of a two-dimensional vision sensor and a three-dimensional vision sensor.

* * * * *